Oct. 12, 1926.
W. O. KROENKE
FOOT VALVE
Filed Oct. 9, 1925
1,603,119
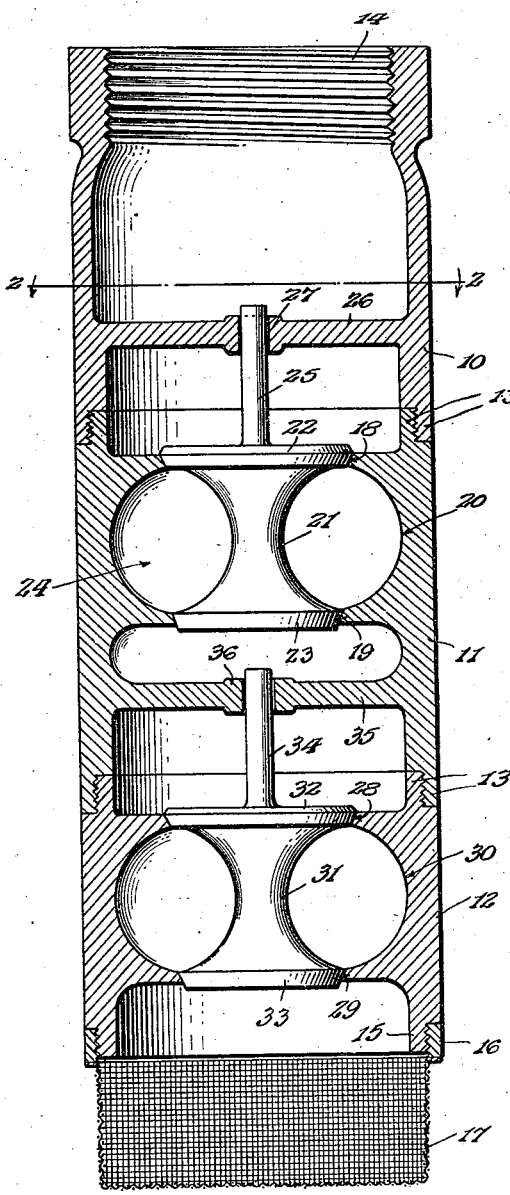
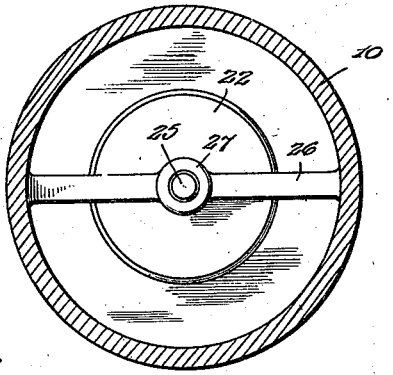
Inventor
W. O. Kroenke.

Patented Oct. 12, 1926.

1,603,119

UNITED STATES PATENT OFFICE.

WALTER O. KROENKE, OF FALL RIVER, MASSACHUSETTS.

FOOT VALVE.

Application filed October 9, 1925. Serial No. 61,610.

This invention relates to an improved foot valve and while being well adapted for general use, is, nevertheless, particularly designed for use in connection with gasoline pumps.

The invention seeks, among other objects, to provide a foot valve for the purpose indicated which will not leak.

The invention seeks, as a further object, to provide a structure embodying a tandem poppet valve unit having spaced integrally connected valves, wherein primary guiding means will be provided for loosely directing the movement of the unit, and wherein secondary guiding means will also be provided for accurately seating both valves.

A further object of the invention is to provide a structure wherein a ground valve seat will be employed for each valve of the unit, wherein each valve will be accurately ground to fit its seat, and wherein each of said valve seats will cooperate with its associated valve for precisely guiding the other valve to its seat so that both valves will always be caused to seat true and seal the valve ports.

Still another object of the invention is to provide a structure embodying primary and secondary valve units of the character indicated.

And the invention seeks, as a still further object, to provide a novel valve casing whereby the valve may be readily removed.

Other objects of the invention not previously specifically mentioned will appear in the course of the following description.

Figure 1 is a vertical sectional view of my improved foot valve, and

Figure 2 is a transverse sectional view on the line 2—2 of Figure 1, looking in the direction indicated by the arrows.

In carrying the invention into effect, I employ a cylindrical valve casing which is composed of a plurality of sections 10, 11 and 12 respectively. At their confronting ends the sections are formed with mating internally and externally threaded flanges 13 which are screwed together for detachably connecting the sections with each other while the section 10 is provided at its upper end with internal threads, as indicated at 14, for connecting the valve casing with a pump pipe. Formed on the section 12 at its lower end is an internally threaded flange 15, and removably screwed over said flange is a collar 16 to which is appropriately fixed a depending strainer cup which may be of wire gauze.

Formed in the section 11 of the casing are spaced upper and lower valve seats 18 and 19 concentric to the axis of the casing. The upper seat is of somewhat greater diameter than the lower seat, while between the seats the casing section is cut away to define an annular passage 20 substantially semi-circular in cross section. It is important to note that both seats are accurately ground.

Cooperating with the valve seats 18 and 19 is an integral valve unit 21 provided at its ends with tandem bevelled valves 22 and 23 which are accurately ground to fit said seats. The valve unit is of double conic contour so that when the valves are closed in engagement with the seats, as shown in the drawings, the portion of the unit between the valves serves, in conjunction with the wall of the channel 20, to define between the valve seats and annular chamber 24 of substantially circular cross section. Rising from the upper end of the valve unit is an axially disposed stem 25, and extending across the casing section 10 near its lower end is a spider 26 having a sleeve 27 loosely receiving said stem therethrough.

The spider 26 and sleeve 27 provide a primary guiding means for the valve unit, serving to loosely guide the valve unit to closed position as well as prevent upward displacement of said unit. However, particular attention is directed to the fact that the sleeve 27 is of an internal diameter considerably greater than the diameter of the stem 25. Accordingly, as the valve unit travels toward closed position and the valves 22 and 23 touch the seats 18 and 19, the valve unit is centered with respect to the valve seats by said seat while the stem is centered within the sleeve 27 out of contact therewith. As a result, the valve unit is free to be guided by the seats 18 and 19 and each ground seat will coact with one of the ground valves respectively centering the valve unit and accurately guiding the other valve to closed position. The valve seats thus provide a secondary guiding means for accurately seating the valves in the same position relative to the axis to said seats each time the valve unit is closed so that the valves will, therefore, function to effectually seal the valve ports at said seats to prevent leakage.

Formed in the casing section 12 are spaced upper and lower ground valve seats 28 and 29 between which is a channel 30, and mounted to cooperate with said seats is a valve unit 31 having valves 32 and 33 ground to fit said seats. Rising from the valve unit is a stem 34, and extending across the casing section 11 near its lower end is a spider 35 having a sleeve 36 loosely receiving said stem. All of this structure is identical with the corresponding structure, as previously described and functions in like manner. A detailed explanation of the operation of the valve unit 31 is accordingly believed to be unnecessary. However, it is to be noted that the valve unit 21 provides an upper primary valve unit for closing the passage through the valve casing while the unit 31 provides a secondary valve unit serving a like purpose for preventing possible leakage, and by detaching the casing section 12 from the section 11, the unit 31 may be readily removed while by detaching the section 11 from the section 10, the unit 21 may be likewise readily removed.

Having thus described the invention, I claim:

A foot valve comprising a casing open at its ends and including upper, lower and intermediate sections releasably connected to each other, vertically spaced annular flanges in said intermediate and lower sections and having their peripheral edge portions bevelled from their upper faces to form downwardly tapered valve seats, a spider in said intermediate section below the lower flange thereof, a spider in the upper section, said spiders being formed with openings in axial alinement with the casing sections and valve seats, and valves movable longitudinally in said casing and each having a body portion and an upstanding stem extending axially therefrom, the body portions of said valves being vertically disposed in said casing between companion flanges and having diametrically enlarged portions beveled at their edges to accurately fit upon said valve seats and the stems being freely slidable through the openings in said spiders.

In testimony whereof I affix my signature.

WALTER O. KROENKE. [L. S.]